United States Patent [19]

Gibson

[11] Patent Number: 4,512,382

[45] Date of Patent: Apr. 23, 1985

[54] INDEXING AND LOCKING ASSEMBLY FOR MULTI-PIECE TRUCK RIMS

[76] Inventor: Donald L. Gibson, 9 Mumford Dr., Columbia, Mo. 65201

[21] Appl. No.: 373,005

[22] Filed: Jun. 4, 1982

[51] Int. Cl.$^3$ .............................................. B60B 25/06
[52] U.S. Cl. .................................. 152/408; 152/410; 301/23
[58] Field of Search .................. 301/23; 152/406, 408, 152/410

[56] References Cited

U.S. PATENT DOCUMENTS

| | | | |
|---|---|---|---|
| 831,586 | 9/1906 | Wilcox | 152/408 |
| 1,009,347 | 11/1911 | Shaw | 152/408 |
| 1,077,282 | 11/1913 | Kelley | 152/408 X |
| 1,087,618 | 2/1914 | Wall | 152/408 |
| 1,222,211 | 4/1917 | Johnson | 152/408 |
| 1,330,061 | 2/1920 | Dillet | 152/406 X |
| 1,798,569 | 3/1931 | Wagenhorst | 152/408 |
| 2,381,963 | 8/1945 | Anderson | 152/406 X |

Primary Examiner—David A. Scherbel
Attorney, Agent, or Firm—Schmidt, Johnson, Hovey & Williams

[57] ABSTRACT

An indexing and locking assembly for a two or three piece truck tire rim and which rim presents at least a base and a locking ring which is attached to the base to complete the same for mounting of the tire upon the rim. Means are provided on the base for indexing the ring with respect to the base, there also being means on the base and cooperating with the indexing means for locking the ring on the base. The indexing and locking means correct for disparaties such as out of roundness of the base or ring; physical deformation of the ring; or a mismatch between the ring and the base to which it is being attached, all to the end that the ring is properly placed upon and attached to the base and will not unexpectedly detach from the base during handling of the truck tire and rim whereby to cause injury to persons or damage to property.

The index means is in the form of a pair of spaced apart tabs located on one side of a gap in the ring, which is presented by a transverse split in the ring, and the locking means is in the form of a lug positioned on the opposite side of the gap, the tabs and the lug being spaced apart along the gutter which circumscribes the base as a part of the conventional base assembly. The ring has a pair of notches therein for receiving the tabs when the ring is being attached to the base and a slot therein for receiving the lug, the tabs and the lug each presenting a ramp on the normally uppermost face thereof to aid in positioning the ring on the base, the tab proximal to the gap and the lug each having the wall thereof which is adjacent the gap beveled and tapered inwardly whereby to guide the ring onto the base and insure that the ring is fully and properly seated within the gutter of the base.

5 Claims, 14 Drawing Figures

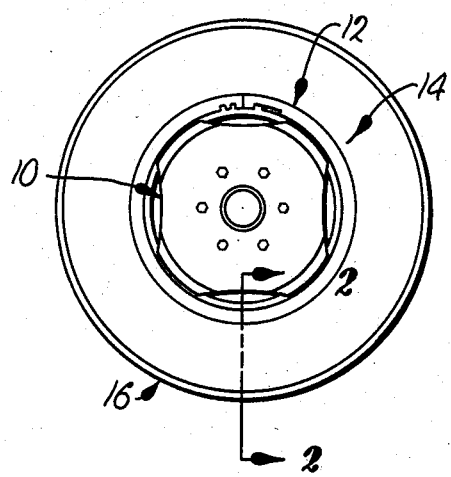
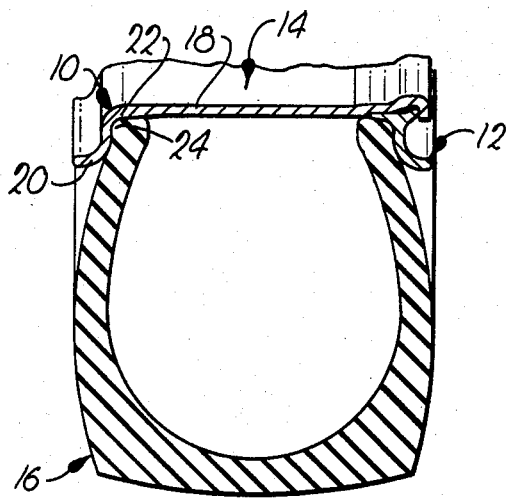
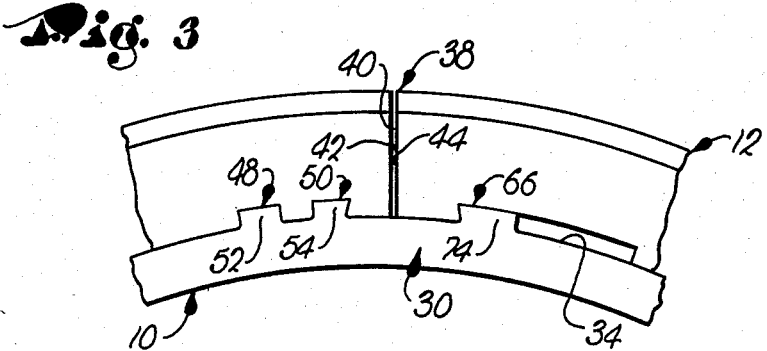
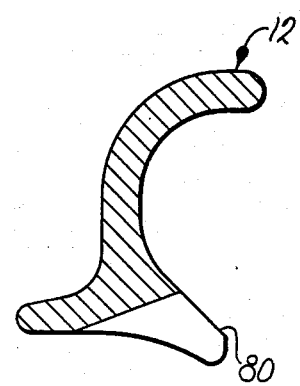
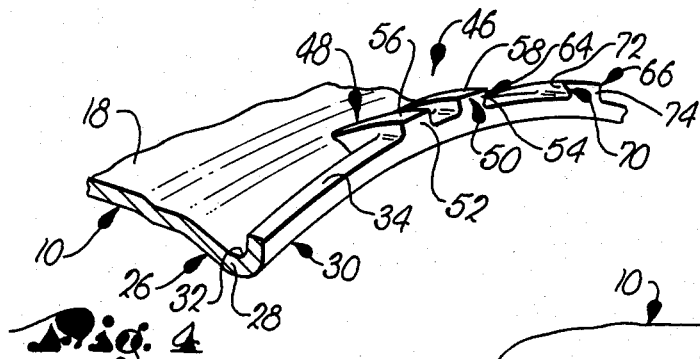
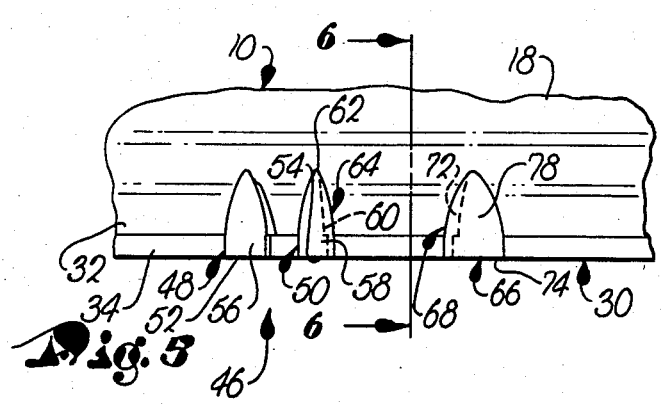

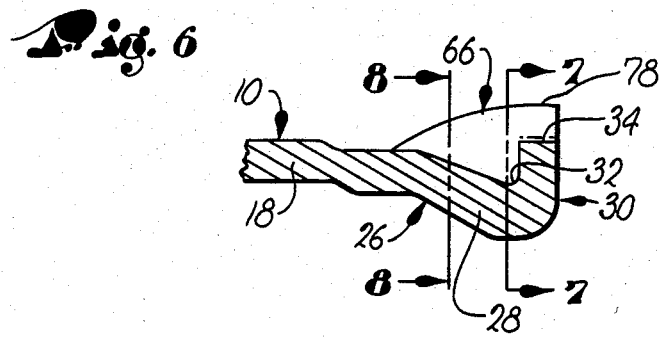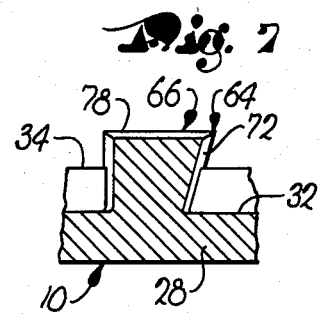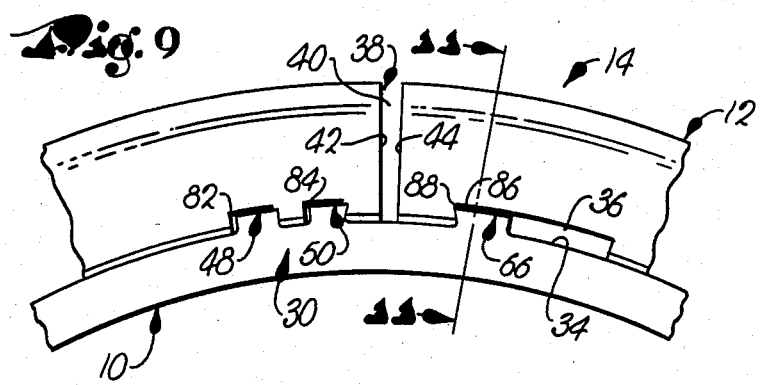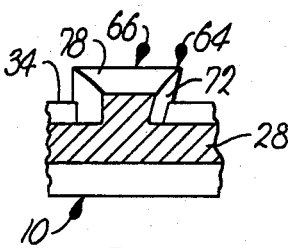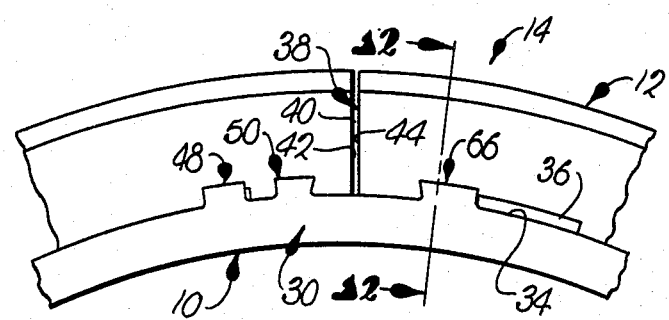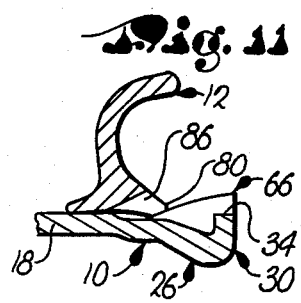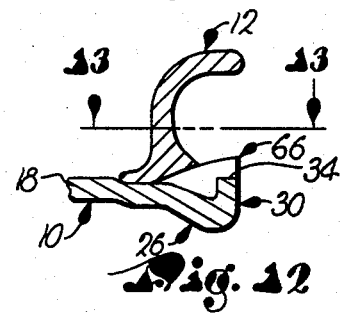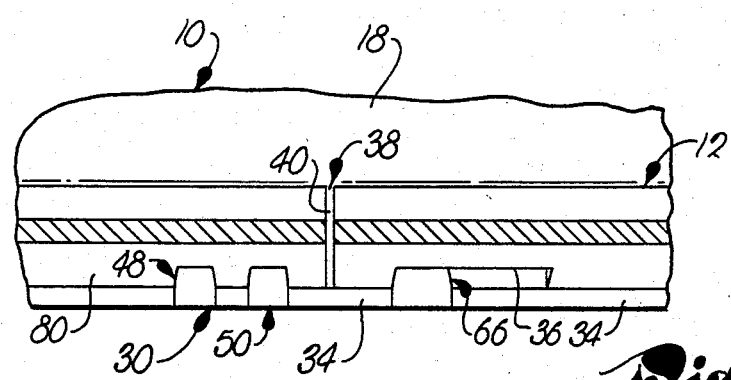

INDEXING AND LOCKING ASSEMBLY FOR MULTI-PIECE TRUCK RIMS

FIELD OF THE INVENTION

This invention relates to a multi-piece truck tire rim, be it of two or three pieces, and more specifically an assembly which forms a part of the base and of the split ring which is attached to the base, whereby the ring may be indexed with respect to the base when the ring is being attached to the base in order to assure that there is not a mismatch between the ring and the base and to also compensate for possible physical deformation of the ring or base and also for out of roundness of the ring or base which might have resulted from the wear and tear on either.

The invention provides indexing tabs and a locking lug which are carried by the base along the peripheral edge thereof in laterally, circumscribing spaced relationship, there being notches in the split ring for receiving the indexing tabs and a slot in the split ring for receiving the locking lug whereby the ring may be surely and securely attached to the base and in such a manner that the ring will not unexpectedly detach itself from the base under pressure whereby to cause personal injury or property damage.

BACKGROUND OF THE INVENTION

The genesis of this invention is the considerable amount of personal injury and property damage which has, over the last several years, been caused as the result of the utilization of multi-piece truck tire rims, which truck tire rims are conventionally formed from two or three pieces but, in any event, include a basic rim which generally carries the tire, there being a ring which is attached to the rim whereby to secure the tire in place thereupon when the tire is mounted and prior to inflation of the tire.

Due to such factors as out of roundness of the base or the ring; a physical deformity of the ring; or a mismatch between the ring and the base, it is not unusual for the ring to separate from the base once air pressure is applied to the tire which is mounted on the completed base and ring rim assembly.

Such separation normally occurs when the tire is being handled or aired by a person and the resulting separation, given the air pressure within the tire, causes the ring to fly loose and it is not unusual for the ring to strike the attendant who is airing the tire and cause serious physical injury or death.

As a result of these conditions and the rather extensive injuries and deaths which have occurred as a result of the utilization of multi-piece truck tire rims, this present indexing and locking assembly has been developed to insure that the ring is properly placed on a matching base; that the ring is securely attached thereto; and that the nature of mounting the ring on the base accommodates for out of roundness of the ring or base or a physical deformity of the ring.

SUMMARY OF THE INVENTION

The indexing and locking assembly for a multi-piece truck rim hereinafter described, includes means on the base for indexing the ring with respect to the base and means cooperating with said indexing means for locking the ring on the base, the indexing and locking means being spaced circumferentially apart along the gutter which is conventionally provided on the rim base, the indexing means being in the form of a pair of spaced apart tabs, the locking means being in the form of a lug, the tabs and the lug each having a portion extending outwardly from the peripheral edge of the base, there being notches in the ring corresponding to the tabs and a slot in the ring corresponding to the lug, the notches being on one side of a gap formed by a transverse split in the ring and the slot being on the opposite side of said gap whereby the ring may be contracted and expanded as it is attached to the base and moved over ramps presented by the tabs and the lug into a position seated within the gutter of the base, there being an inwardly tapered and beveled wall on the tab adjacent the gap and the wall of the lug adjacent the gap whereby to retain the ring in a secure position with respect to the base once it has been moved into a seated engagement with the heel of the ring in the gutter of the base.

BRIEF DESCRIPTION OF THE DRAWINGS

FIG. 1 is an elevational view of a multi-piece truck tire rim of the type hereinafter described and having the tire mounted thereon;

FIG. 2 is an enlarged sectional view taken on line 2—2 of FIG. 1;

FIG. 3 is an enlarged fragmentary view of the base and the locking ring with the ring attached to the base;

FIG. 4 is a fragmentary perspective view of a portion of the base;

FIG. 5 is a top plan view comparable to FIG. 4;

FIG. 6 is a sectional view taken on line 6—6 of FIG. 5;

FIG. 7 is a sectional view taken on line 7—7 of FIG. 6;

FIG. 8 is a sectional view taken on line 8—8 of FIG. 6;

FIG. 9 is a fragmentary elevational view showing the ring as it is being mounted on the base but in an unlocked condition;

FIG. 10 is a view comparable to FIG. 9 but showing the ring locked on the base;

FIG. 11 is a sectional view taken on line 11—11 of FIG. 9;

FIG. 12 is a sectional view taken on line 12—12 of FIG. 10;

FIG. 13 is a sectional view taken on line 13—13 of FIG. 12; and

FIG. 14 is an enlarged transverse cross-sectional view of the locking ring.

DESCRIPTION OF THE PREFERRED EMBODIMENT

The indexing and locking assembly hereinafter described is particularly intended for use as a part of a multi-piece truck tire rim, which rim may consist of two or three pieces but which, in any event, consists of two major components namely a base 10 and a locking ring 12, the locking ring being adapted for attachment ro the base, whereby to present a composite truck rire rim, broadly designated as 14 and upon which a conventional tire 16 may be mounted as shown for instance in FIGS. 1 and 2 of the drawing.

The base 10 incorporates conventional construction in that it presents a flat, central portion 18 having a flange 20 circumscribing one edge thereof, whereby to present a bead seat radius 22 which, as best illustrated in FIG. 2 of the drawing receives the bead 24 of the tire 16 in seated, sealing engagement when the tire is inflated.

The opposite edge of the rim 14 and particularly flat, central portion 18 thereof, is beveled as shown for instance at 26 in FIG. 6 of the drawing whereby to present an outwardly inclined portion 28 which terminates in a peripheral marginal edge 30 presenting a gutter 32, there being a gutter tip 34 as the outermost portion of the side of the rim 14 which receives the locking ring 12 in seated relationship with respect to the gutter 32 as shown for instance in FIG. 2 of the drawing whereby to support the tire 16 upon the rim 14 so that the tire may be inflated and the entire wheel assembly then mounted upon a truck or other vehicle for use.

The purpose of providing a multi-piece truck tire rim as hereinabove generally described, is to facilitate the mounting of the tire 16 upon the rim 14 and also to make it less difficult to remove the tire 16 from the rim 14 when it is desired to dismount the tire for service, replacement or the like. Thus, for instance, to dismount the tire 16 from its rim 14, a tool is inserted within a tool slot 36 which is provided in the ring 12 whereby the ring may be pried apart from the base 10 and thereby permit removal of the tire 16 from the rim 14.

The ring 12 is a split ring; that is, it is provided with a transverse split 38 whereby to present a gap 40 between the adjacent ends 42 and 44 of the ring 12, all in order that the ring 12 may be expanded to remove the same from its position of attachment to the base 10 and in order that the ring 12 may be expanded as it is mounted upon the base 10 after the tire 16 has been repaired and replaced.

It will be appreciated, however, that when a ring such as 12 is removed from the base 10 the ring is often distorted and deformed through utilization of a tire tool in prying the ring from its base. Such distortion or deformation of the ring will subsequently make it difficult to securely mount or attach the ring upon its base after the tire has been replaced.

Furthermore, it is common for either the base or the ring to assume an out of round condition, either as a result of the normal wear and tear of such components or as a result of utilization of heavy tools in prying the ring from the base whereby it is subsequently difficult to mount the ring upon the base.

Yet another problem which arises is that, in a large tire changing operation, the initial components of a rim such as a matched base and ring, will become separated whereby the user will attempt to match a ring with a base for which it was not intended, such mismatch between the ring and the base causing a misfit between such components when the ring is attached or attempted to be reattached to a base.

All of these problems result in hazardous conditions, most hazardous being that the ring will become detached from the base once the tire is inflated and pressure is brought to bear upon the ring. When such detachment occurs, the ring is thrown, under a substantial pressure, through the air and since such detachment can occur while a user is handling or airing the tire, it is not uncommon for the ring to strike such person and cause serious injury or even death.

Thus the indexing and locking assembly hereinafter described in detail has been developed for use in connection with a multi-piece truck tire rim as hereinabove described and in order to insure that the ring is properly fitted to a matched base and will not inadvertently become detached therefrom.

To accomplish this result an indexing assembly, broadly designated as 46 is formed on the base 10, the indexing assembly consisting of a pair of spaced apart tabs 48 and 50, which tabs 48 and 50 are of generally triangular, plan configuration as shown for instance in FIG. 5 of the drawing. The tabs being spaced apart along the gutter 32 of the base 10.

A portion of each of the tabs 48 and 50 extends diametrically beyond the peripheral edge 30 of the base 10 as clearly shown in FIG. 4 of the drawings whereby to present outwardly facing surfaces 52 and 54 respectively which surfaces each extend outwardly from peripheral edge 30 of the base 10 and are in substantially coplanar relationship with such peripheral edge 30.

As indicated, each of the tabs 48 and 50 is generally triangular in plan configuration and each tab presents a normally uppermost surface 56 and 58 respectively which surfaces 56 and 58 define a ramp on the top of each tab, the ramps each being inclined from their corresponding outwardly facing surfaces 52 and 54 toward the center of the base 10 and spanning the gutter 32 of base 10.

The wall 64 of tab 50, which is the tab proximal to gap 40 in the ring 12, is undercut whereby to provide a beveled stretch 60 which extends from the outwardly facing surface 54 of tab 50 to the apex 62 of said tab 50. Additionally, said wall 64 of the tab 50 is also tapered from the outwardly facing surface 54 of said tab toward the apex 62, such beveled, tapered construction being provided for purposes which will be hereinafter described.

The locking means is in the form of a lug 66 which is formed on the base 10 in spaced circumferential relationship from tabs 48 and 50, as illustrated in FIGS. 3 and 4 for instance, the locking lug 66 being of generally triangular configuration in plan as shown in FIG. 5. The locking lug 66 presents a wall which is adjacent to the gap 40 defined by split 38 such wall 68 being undercut as shown for instance at 70 whereby to present an inwardly beveled surface 72. The wall 68 of lug 66 is also tapered from the outwardly facing surface 74 of the lug 66 inwardly toward apex 76 of the lug 66. Similarly to tabs 48 and 50, the normally uppermost surface of the lug 66 presents a ramp 78 which is inclined downwardly from surface 74 of lug 66 toward the center of the base 10 and which ramp spans the gutter 32.

In order that the split ring 12 may be readily, safely and securely mounted upon the base 10 in the final position shown in FIGS. 2 and 10 of the drawing, the heel 80 of the ring 12 is provided with a pair of notches 82 and 84 to receive tabs 48 and 50 respectively and is also provided with a slot 86 which receives locking lug 66. The slot 86 may be formed as an extension of the conventionally provided tool slot or could be an independently formed slot, configured to receive the lug 66.

It is to be noted that the notches 82 and 84 conform, in configuration to the cross-sectional configuration of their respective tabs 48 and 50 and likewise the edge 88 of slot 86 which is proximal to the gap 40, is configured to accommodate the beveled, tapered wall 68 of the locking lug 66.

As illustrated in FIGS. 9 and 10 of the drawing, when it is desired to mount the ring 12 upon the base 10, the ring is initially indexed with respect to the base by aligning notches 82 and 84 in the ring with the tabs 48 and 50 formed on the base 10. Such indexing insures that there is not a mismatch between the ring and the base and that the ring is one which is intended to be received by a corresponding base.

Once the ring is aligned and indexed as shown for instance in FIG. 9 of the drawing, the ring may be then pried onto the base through the utilization of tool slot 86 and a tool which is inserted in the slot whereby to pry upwardly and inwardly on the ring 12 with respect to the base 10. It should be noted that since the ring 12 is split as at 38, it may be circumferentially contracted and expanded and thus the gap 40 would be at its maximum width when the ring was initially placed upon the base and prior to the ring being finally mounted upon the base.

As the ring 12 is moved toward the center of the base 10, the edges of notches 82 and 84 and the upper edge of the slot 86, will ride upon the ramps formed by the uppermost surfaces 56, 58 and 78 of the tabs 48 and 50 and the lug 66 respectively whereby to permit the ring to readily slide inwardly toward the center of base 10. At the same time, the edges of notch 84 and slot 86 which are in engaging relationship to the wall 64 of tab 50 and wall 68 of lug 66, will seat within the beveled portion and, due to the tapering of said walls, will be caused to move toward the center of base 10 in engagement with said walls.

As such movement occurs, the configuration of said walls 64 and 68 will draw the ring together whereby to reduce the dimension of the gap 40 and will also cause the ring 12 and particularly the heel 80 thereof to seat within the gutter 32 of the base 10. Thus, viewing FIGS. 11 and 12 for instance it will be seen that the heel 80 of the ring 12 moves along the ramps presented by the tabs and lug and once the base of the ramp has been reached, which is defined by the apexes of the tabs and lug, the split ring will be forced together and the heel 80 of the ring 12 will be caused to seat securely within the gutter 32.

Furthermore, the presence of the tabs 48 and 50 and the lug 66 will prevent the ring from readily detaching from its base and thus inadvertent removal of the ring, when the tire 16 is inflated, is essentially precluded since the ring has been locked in place upon the base by virtue of tabs 48 and 50 and lug 66. Accordingly, when the tire 16 is inflated and pressure is brought to bear upon the ring, it will be more securely seated within the gutter 32 and there is little chance of the ring being exploded from the base whereby to cause injury or damage. Nevertheless, when it is subsequently desired to remove the ring, an appropriate tool may be inserted within slot 36 in the ring 12 and used to pry the ring from the base, it being appreciated that once one of the ends such as 44 is pried up over the lug 66, the ring will tend to helically unwind from its position upon the base 10.

It will be appreciated that tabs 48 and 50, as well as lug 66, do not need to extend diametrically beyond the peripheral edge 30 of base 10 but could be appropriately positioned within the gutter 32 and below gutter tip 34 and still achieve the same function of indexing and locking the ring 12 with respect to base 10 as hereinabove described.

Thus there is provided an indexing and locking assembly for a multi-piece truck tire rim, which rim may be in the form of either two or three pieces and which indexing and locking assembly insures that the ring is securely mounted upon the base and that it will not inadvertently or accidentally become dislodged therefrom whereby to cause damage or injury.

I claim:

1. An indexing and locking assembly for a multi-piece truck tire rim having at least a base and a locking ring for attachment to the base comprising:
   means on the base for indexing the ring with respect to the base;
   means cooperating with said indexing means for locking the ring on the base;
   said base having a gutter circumscribing the base, said indexing and locking means being spaced apart along said gutter, said gutter having a tip, said indexing means and locking means partially overlying said tip whereby to present outwardly facing surfaces, said outwardly facing surfaces being substantially coplanar with the peripheral edge of the base;
   said indexing means being in the form of a pair of spaced apart tabs, a portion of each of said tabs extending outwardly from said peripheral edge of the base;
   said locking means being in the form of a lug, a portion of said lug extending outwardly from said peripheral edge of the base, said lug being laterally spaced, along said peripheral edge, from said tabs;
   said locking ring having a pair of notches therein for receiving said tabs when the ring is attached to the base and a slot therein for receiving said lug when the ring is attached to the base, said ring being split to present a gap, said tabs and notches being on one side of said gap when the ring is attached to the base, said lug and slot being on the opposite side of said gap, said tabs and said lug each presenting a ramp on the normally uppermost surface thereof, said ramps each being inclined from its outward facing surface toward the center of the base.

2. An indexing and locking assembly for a multi-piece truck tire rim as set forth in claim 1, the tab proximal to said gap and the lug each having the wall thereof adjacent said gap bevelled and tapered inwardly.

3. An indexing and locking assembly for a multi-piece truck tire rim having a base and a ring for attachment to the base comprising:
   means for indexing the ring with respect to the base, the base having a gutter, the indexing means including at least one tab extending outwardly from the gutter, the tab presenting a ramp on the normally uppermost surface thereof, the ramp being inclined from the gutter toward the center of the base;
   means for locking the ring on the base, the locking means including a lug extending outwardly from the gutter, the lug being laterally spaced along said gutter from said tab, the lug presenting a ramp on the normally uppermost surface thereof, the ramp being inclined from the gutter toward the center of the base; and
   the ring having a notch therein for receiving said tab and a slot therein for receiving said lug when the ring is attached to the base.

4. An indexing and locking assembly for a multi-piece truck tire rim as set forth in claim 3, the tab and the lug each having a wall thereof bevelled and tapered inwardly for mating with said notch and slot respectively to retain the ring with respect to the base.

5. An indexing and locking assembly for a multi-piece truck tire rim as set forth in claim 4, the ring being split between said tab and said lug whereby to present two free ends, said ends being forced into proper position with respect to each other and the base to insure retention of the ring on the base when the tab mates with the notch and the lug mates with the slot.

* * * * *